US012627663B2

(12) United States Patent
Post

(10) Patent No.: US 12,627,663 B2
(45) Date of Patent: *May 12, 2026

(54) FACTOR HEALTH ASSESSMENT AND SELECTION FOR LOGIN AT AN IDENTITY PROVIDER

(71) Applicant: OKTA, INC., San Francisco, CA (US)

(72) Inventor: Daniel Jeffrey Post, Pacifica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,440

(22) Filed: Apr. 22, 2024

(65) Prior Publication Data

US 2024/0275785 A1 Aug. 15, 2024

Related U.S. Application Data

(63) Continuation of application No. 18/310,444, filed on May 1, 2023, now Pat. No. 12,034,722, which is a continuation of application No. 17/098,313, filed on Nov. 13, 2020, now Pat. No. 11,677,750.

(51) Int. Cl.
*G06F 21/00* (2013.01)
*G06Q 30/018* (2023.01)
*H04L 9/40* (2022.01)

(52) U.S. Cl.
CPC ..... *H04L 63/0884* (2013.01); *G06Q 30/0185* (2013.01); *H04L 63/102* (2013.01)

(58) Field of Classification Search
CPC ............... H04L 63/0884; H04L 63/102; H04L 63/0838; H04L 63/0861; H04L 63/08; H04L 2463/082; G06Q 30/0185
See application file for complete search history.

(56) References Cited

U.S. PATENT DOCUMENTS

| | | | |
|---|---|---|---|
| 11,677,750 B2 | 6/2023 | Post | |
| 2015/0319156 A1* | 11/2015 | Guccione | H04L 63/083 |
| | | | 726/7 |
| 2017/0006019 A1* | 1/2017 | Addala | H04L 63/0807 |
| 2017/0019500 A1* | 1/2017 | Yan | G06Q 30/06 |
| 2017/0126649 A1* | 5/2017 | Votaw | H04L 63/0815 |
| 2019/0236254 A1* | 8/2019 | Ballard | H04L 9/3231 |
| 2019/0251242 A1 | 8/2019 | Alleaume et al. | |
| 2019/0311093 A1 | 10/2019 | Moloian et al. | |
| 2022/0109673 A1* | 4/2022 | Robinson-Morgan | |
| | | | H04L 63/0861 |

(Continued)

OTHER PUBLICATIONS

Jacob Abbott and Sameer Patil. 2020. How Mandatory Second Factor Affects the Authentication User Experience. In Proceedings of the 2020 CHI Conference on Human Factors in Computing Systems (CHI '20). Association for Computing Machinery, New York, NY, USA, 1-13. https://doi.org/10.1145/3313831.3376457 (Year: 2020).

(Continued)

*Primary Examiner* — Kendall Dolly
(74) *Attorney, Agent, or Firm* — Holland & Hart LLP

(57) ABSTRACT

Users of an identity provider system may be authorized to use a variety of different types of factors from a variety of different factor providers. The identity provider system monitors and analyzes the "health" of the different possible factors available to a user, e.g., their availability relative to error rate. Using the results of the analysis, the identity provider can assess which factors are the most appropriate for a given user seeking authentication and can improve the user experience for the user by emphasizing those most appropriate factors to the user.

20 Claims, 3 Drawing Sheets

(56)          References Cited

U.S. PATENT DOCUMENTS

| 2022/0116390 A1* | 4/2022 | Jass | H04W 12/06 |
| 2022/0124098 A1* | 4/2022 | Shiralkar | H04L 63/20 |
| 2022/0272083 A1* | 8/2022 | Rule | H04L 9/3242 |
| 2023/0269251 A1 | 8/2023 | Post | |

OTHER PUBLICATIONS

PCT International Search Report and Written Opinion, PCT Application No. PCT/US2021/058763, Mar. 2, 2022, 10 pages.

* cited by examiner

200

210
Monitor
authentication factor
health

220
Determine factors
are above/below
threshold

230
Receive request to
authenticate user

240
Identify enrolled
factors

250
Determine first
factor is current
default factor

260
Select second factor
as default

290
Authenticate user

270
Provide UI with
second factor as
default

280
Receive value for
second factor

FACTOR HEALTH ASSESSMENT AND SELECTION FOR LOGIN AT AN IDENTITY PROVIDER

CROSS-REFERENCES TO RELATED APPLICATIONS

This application is a continuation of U.S. patent application Ser. No. 18/310,444, filed May 1, 2023, and entitled "FACTOR HEALTH ASSESSMENT AND SELECTION FOR LOGIN AT AN IDENTITY PROVIDER," which is a continuation of and claims priority to U.S. patent application Ser. No. 17/098,313, now U.S. Pat. No. 11,677,750, filed on Nov. 13, 2020, and entitled "FACTOR HEALTH ASSESSMENT AND SELECTION FOR LOGIN AT AN IDENTITY PROVIDER," the content of each which is incorporated herein by reference in its entirety.

FIELD OF ART

The present invention generally relates to the field of software systems, and more specifically, to facilitating user login for identity provider systems that authenticate user identities.

BACKGROUND

Identity provider (IdP) systems establish an identity of a user wishing to gain access to resources. For example, an electronic mail service typically requires users wishing to access an account on the service to authenticate their identities using one or more types of information (hereinafter referred to as "authentication factors", or simply "factors"). Examples of various types of factors include credentials such as usernames and passwords, one-time passwords (OTPs), hardware tokens, biometrics, and the like. The different factors may be provided by different entities (hereinafter referred to as "factor providers").

The different types of factors may have different levels of availability. For example, one type of factor (such as an OTP) might be delivered by a third-party service, and over a computer network, either of which could be unavailable for certain periods of time, e.g., due to network problems, to rate limiting, to failure of hardware of the third-party service, or to misconfiguration of software used to interface with the third-party service, as just some examples. If a particular type of factor is unavailable to an IdP system at the time that a user is attempting to use the IdP system to establish its identity, the user's attempt to authenticate will fail. This results in a poor user experience and frustration of the user with the IdP system, and (if frequent) may also violate any availability guarantees (e.g., a guarantee of 99.99% availability) promised by an IdP to its customers or other users.

Although a particular user might have a number of different factor types of available to her for use with the IdP system, she may not realize that the other factor types are options, resulting in additional work for I.T. staff who must respond to her requests for assistance. Even if she does realize that other factors are options, choosing the appropriate one requires additional knowledge and decision-making that tends to reduce her satisfaction with the IdP.

SUMMARY

An identity provider system analyzes the "health" of the various factor types and providers available to users, identifying which factors are likely to be presently available and which factors are currently frequently failing. The identity provider system leverages the data obtained from this analysis to provide particular users wishing to be authenticated by the identity provider with factor options. The factors options may be presented to the users in ranked order, according at least in part to their determined probabilities of availability.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
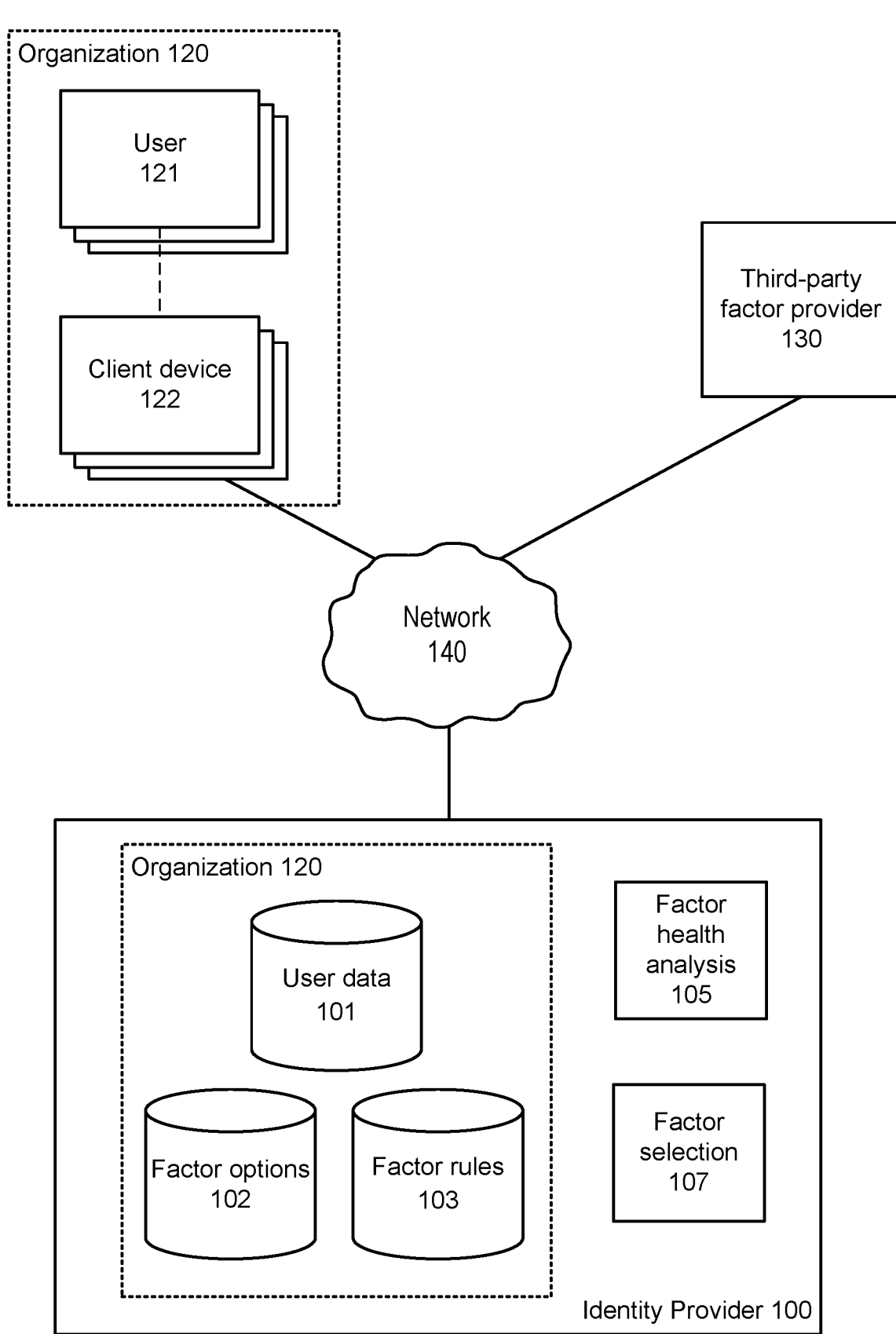
FIG. 1 illustrates one embodiment of a computing environment in which an identity provider (IdP) system compensates for the possible unavailability of certain types of factors by tracking factor health and intelligently and transparently selecting factors appropriate for use with a particular user at a particular moment.

FIG. 1 illustrates one embodiment of a computing environment in which an identity provider (IdP) system compensates for the possible unavailability of certain types of factors by tracking factor health and intelligently and transparently selecting factors appropriate for use with a particular user at a particular moment.

Users 121 use their client devices 122 to communicate with an identity provider system (hereinafter "IdP system") 100 to verify their identities, e.g., when seeking access to a resource such as an electronic service like an email provider, a local computer system, or any other sort of resource to which only particular users are to be granted access. In different embodiments, the IdP system 100 may itself control the resources being requested by the users 121, or the IdP system may act as a service that authenticates the user to other third-party services that have the resources that the user wishes to access.

The different factor types may be provided to the IdP system 100 by third-party factor providers 130. For example, one particular third-party factor provider 130 might provide the IdP system 100 with one-time passwords via short message service (SMS) messages. However, factors provided by a particular third-party factor provider 130 to the IdP system 100 could fail to be received due to any number of different causes, such as a general system failure of the factor provider, a failure of the network between the factor provider and the IdP system, a failure of the IdP system to properly integrate with the factor provider, or the like.

In some embodiments, the IdP system 100 provides identity verification as a service to different individual users. In other embodiments (as illustrated in FIG. 1), the IdP system 100 acts on behalf of a number of different organizations 120, which in turn each has a number of different users.

The IdP system 100 includes user data 101 of known users whose identities may be identified, a set of factor options 102 indicating which factor types and/or factor providers may be used by which users, and an optional set of factor rules 103 controlling how the different possible factor types are to be selected for individual users. In embodiments in which the IdP system 100 acts on behalf of different organizations 120, the IdP system has a set of user data 101, factor options 102, and factor rules 103, for each such distinct organization 120. The IdP system 100 further includes a factor health analysis module 105 that assesses whether and/or to what extent the different factor types and factor providers are currently properly functioning. The IdP system 100 additionally includes a factor selection module 107 that applies the findings of the factor health analysis module 105 by selecting the proper factors to require of a particular user at the current time. The IdP system 100 may also provide additional services beyond identity services, such as single sign-on, in which a user of the organization signs in to the system 100, and the system handles authentication of the user on all of the third-party services to which the user has access.

The details of the various components of the IdP system 100 are now described in more detail.

The user data 101 includes a set of identities of known users whose identities may be identified on the IdP system 100. The user data 101 may include a form of identity such as a username, as well as other credential data associated with a user, such as user password. The user data 101 may also include many other types of data about users, such as the factor types and providers that they may use when seeking identity verification, their role within the organization 120 (if any) to which they belong (e.g., "Engineering", "Legal", "Manager 2", "Director", or the like), and/or the third-party services to which they have access (e.g., SALES-FORCE, MICROSOFT OFFICE 365, SLACK, or the like), as some examples.

The factor options 102 data includes a list of which factor types and/or providers a given user is permitted to use when the user's identity is being verified. As an example, possible factor and/or provider options might include an SMS factor by a Provider A and another SMS factor by Provider B; a biometric factor provided by Provider C; a push factor provider by Provider A and provider D; or the like. Some factor types may be provided by the same organization that administers the IdP system 100, rather than relying on third-party factor providers 130 for those factors. In some embodiments, this list of which users can use which factor types and/or providers can be specified directly (i.e., a direct association between a user and a set of factor types/providers) or indirectly (e.g., by assigning users to groups, and associating the groups with factor type/provider options). For example, a particular user (or group) might be given the option of using a username/password, a fingerprint, a one-time password sent over SMS by a particular SMS provider, or a hardware token, during identity verification. The factor options 102 data may be specified by an organization 120 for its constituent users 121 so as to set the available factor options from which its users may choose. In some embodiments, the user must first enroll the factors/providers of the factor options 102 data on the user's client device before those factors are available for use on the client device, and the client device communicates the enrollments to the IdP system 100, which stores indications of the factors and providers enrolled by the users within an enrolled factors list (not illustrated in FIG. 1). The factor selection module 107 may then consult the enrolled factors list to identify which factors a given user is eligible to use.

The factor rules 103 include express rules that may be manually-specified, such as by system administrators. For example, if system administrators learn that a particular factor type provided by a particular factor provider is experiencing difficulties at the present, the administrators may add a rule to the factor rules 103 to specify that that particular factor type and factor provider are not currently reliable. The rule may then be used by the factor selection module 107, e.g., to determine that that particular factor type and factor provider should not currently be offered as a factor option (or should only be offered to a small number of users as a test).

The factor health analysis module 105 assesses whether and/or to what extent the different factor types and factor providers are currently properly functioning. The factor health analysis module 105 can use different techniques to assess factor health (e.g., as measured by failure rate) in different embodiments. For example, in one embodiment, the factor health analysis module 105 analyzes failure rates of different factor types and/or factor providers by analyzing server logs of the IdP system 100 to determine numbers of successful identity verifications relative to numbers of error rates for attempted identity verifications for particular factors and/or factor providers over a particular time window (e.g., the past 15 minutes). For example, the factor health analysis module 105 might determine that a particular factor type of a particular third-party factor provider 130 had a 32% failure rate over the past 15 minutes. In some embodiments, the factor health analysis module 105 uses distributed counters to track error codes using random sampling mechanisms such as reservoir sampling, and these distributed counters can be accumulated (and also cleared periodically). Two distributed counters may be used, so while one counter is ramping to statistical significance, the other counter is used. In some embodiments, the factor health analysis module 105 accumulates the error codes sent by a SMS gateway API and uses the error codes to track health of the third-party SMS delivery APIs. More generally, the factor health analysis module 105 may use any suitable API error rate monitoring system to quantify error rates.

In some embodiments, the factor health analysis module 105 further segments the analysis according to additional contextual metadata associated with the different factor types and/or providers, where the IdP system 100 has access to such additional metadata. In some embodiments, such additional contextual metadata includes application version, operating system (OS) version, internet protocol (IP) address, or geographical location of the user's client device. For example, a factor's health could be assessed based on the factor type, the factor provider, a version of an application installed on the user's client device 122 that interacts with the IdP system 100, a version of an OS of the client device 122, and the geolocation of the client device 122 (e.g., GPS), with a different failure rate for each distinct combination of the possible values of these variables. The application version and OS version are of significance because certain versions of the application and operating system might have different corresponding "integration" software that integrates with the third-party factor providers 130 and which might be incorrectly configured so as to cause verification errors when attempting to use the associated third-party factor providers. The geolocation and/or IP address are of significance because the computer infrastructure (e.g., network connections) in a particular physical or logical region may be encountering problems at any given moment in time, leading to higher error rates for those regions at that time.

In some embodiments, the results are expressed as scores indicating different degrees of factor health, such as real numbers between 0 and 1, integers from 0 to 100, or the like. In other embodiments, the factor health analysis module 105 expresses results simply as binary values indicating "available" or "not available" (e.g., by first computing a factor health score, and then determining whether the score is above some given threshold).

The factor selection module 107 applies the findings of the factor health analysis module 105 by selecting the proper factors to offer as options for a particular user at the current time. In one embodiment, the factor selection module 107 selects eligible factors based on the factor options 102, the factor rules 103 (if any), and the factor health statistics determined by the factor health analysis module 105. For example, the factor options 102 could constitute the base set of possible factor types and providers for a given user (and/or organization 120 or group thereof), and a combination of the factor rules 103 and the factor health statistics could determine which of those possible factor types and providers are permitted. For instance, the factor rules 103 might indicate that certain factor types/providers were presently unavailable, thereby temporarily disqualifying those types/providers from use, and the factor health statistics could be applied to assess the remaining eligible factors. In some embodiments, the factor health statistics are expressed as scores, and the scores are used to rank the eligible factors from greatest to poorest health, with the user making the final decision of which factor to select. The rankings for the eligible factors can be used to present the eligible factors to a user within a UI, in order of the rankings from greatest to poorest health. For example, the factor health analysis module 105 might always indicate that the IdP system 100 should first ask for a particular primary factor (e.g., a username/password pair), but that then the IdP system 100 may give the user the option of the other eligible factors, starting with the highest-ranked and ending with the lowest-ranked. The ranking of the options can be indicated in different manners within the UI, such as via a drop-down selection list in which the highest-ranking factor is presented as the default, and in which the other eligible factors are presented in ranked order when the list is opened. In some embodiments, the factors need not be ranked purely according to the factor health scores computed by the factor health analysis module 105, but may additionally take into consideration other data, such as factors that the user has used in the past, factors for which the user has expressed a preference in his or her user profile, factors favored by an organization 120 of which a user is a member (e.g., as expressed according to an API of the IdP system 100, or as expressed in other business rules), or the like.

In embodiments in which the factor selection module 107 ranks the eligible factors, third-party systems may use the rankings to present the ranked factors in a user interface, rather than the IdP system 100 itself producing the user interface for factor selection. For example, if one of the organizations 120 were a bank, the bank could provide its users (e.g., employees or customers) with its own user interfaces, including a factor selection user interface to use when logging into their accounts with the bank. However, the bank could use the factor selection module 107 of the IdP system 100 as a service for factor ranking, obtaining the ranked list of the eligible factors for its users, and rendering the factor selection user interface according to the obtained rankings.

In embodiments in which the IdP system 100 acts on behalf of particular organizations, the organization 120 is an entity, such as a corporation, a school, a governmental department, or the like. Physically, the organization 120 is made up of a number of computing systems, including the client devices of the users 121; one or more internal networks that connects the computing systems, including routers or other networking devices that define the boundary between the organization and external networks; and the like.

Similarly, the IdP system 100, although depicted as a single logical system in FIG. 1, may be implemented using a number of distinct physical systems and the connections between them, such as application servers, database servers, load-balancing servers, routers, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The client devices 122 may be any type of computing device with which the users 121 may connect to the IdP system 100, such as a desktop computer, a laptop computer, a tablet computer, a smartphone, a set-top box, or the like.

The third-party factor providers 130 consist of various servers, internal networks, and other computing equipment used to provide factors in response to requests. The third-party factor providers may use various techniques, such as push (e.g., as provided by OKTA, APPLE PUSH NOTIFICATION, GOOGLE FIREBASE CLOUD MESSAGING, or in an indirect manner through FIREBASE, ONESIGNAL, BRAZE, KUMULOS, or other API service providers), short message service (SMS) or voice (e.g., as provided by TWILIO or TELESIGN), or email (e.g., as provided by SENDGRID, MAILCHIMP, MAILGUN, or AMAZON SIMPLE EMAIL SERVICE), as some examples.

Figure 2:
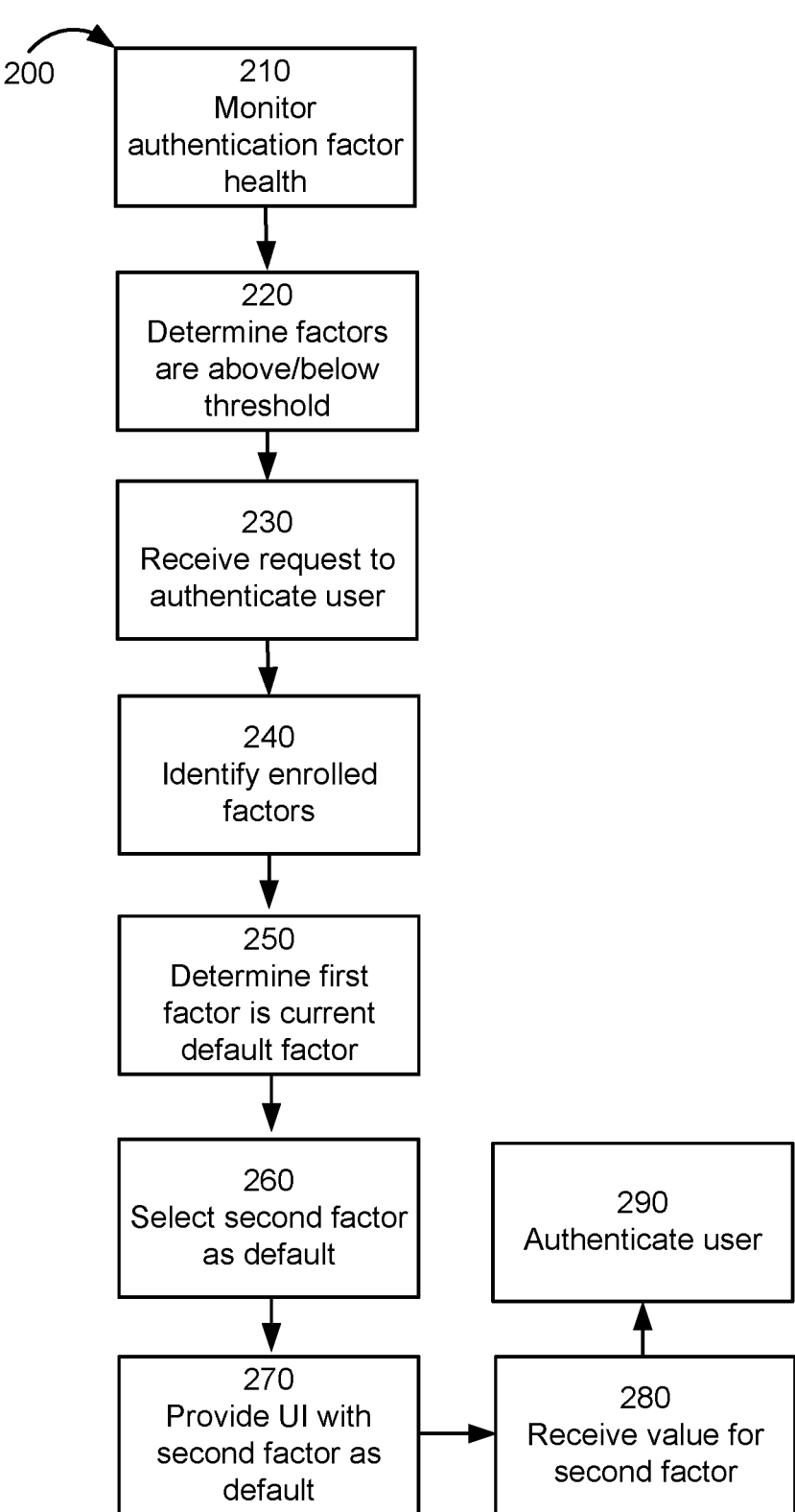
FIG. 2 illustrates steps performed by the identity provider system of FIG. 1 when assessing factor health and applying the resulting information during user authentication, according to some embodiments.

FIG. 2 illustrates steps performed by the IdP system 100 when assessing factor health and applying the resulting information during user authentication, according to some embodiments.

The IdP system 100 monitors 210 authentication factor health for some or all of the various possible authentication factor types and providers listed in the factor options 102, as discussed above with respect to the factor health analysis module 105. For example, the factor health analysis module 105 may monitor the success or failure of some or all of the attempts to authenticate using a particular factor type or provider and update its statistics accordingly.

The IdP system 100 may determine 220 whether factor types and providers are above or below a particular threshold indicating that the factor is sufficiently available at the moment. (In some embodiments, rather than, or in addition to, using a threshold, the IdP system 100 ranks the factor types and providers based on their respective health scores.)

The IdP system 100 receives 230 a request from a user to authenticate the user. Accordingly, the IdP system 100 identifies 240 the eligible factors for the user (e.g., those which the user has enrolled on the user's client device). The IdP system 100 may determine 250 that a first one of the factors is a current default factor for the user (e.g., the factor that is displayed most prominently to the user, such as at the top of a list of possible factors), but based on the determinations of step 220 the IdP system 100 may, nonetheless, select 260 a second one of the factors as the new default factor for the user, e.g., because the second factor is above the particular health threshold and/or has a highest health score of the various eligible factors. Accordingly, the IdP system 100 provides 270 a user interface to the user in which the second factor is the default factor. Further, the provided user interface may entirely omit the first factor as an option, e.g., if the IdP system 100 had determined that the first factor had a health score less than the particular threshold indicating sufficient health.

In the example of FIG. 2, the user provides a value for the second factor, which the IdP system 100 receives 280 and uses to authenticate 290 the user, either by directly performing the authentication or by providing the value to the appropriate third-party factor provider. With the user authenticated, the IdP system 100 may take a further action, such as providing an indication of the authentication to third-party services which the user was attempting to access. In some embodiments, the IdP system 100 additionally provides services other than merely authentication, and may provide the user with access to these additional services after user authentication. For example, in embodiments in which the IdP system 100 provides single sign-on (SSO) services to users and their organizations (if any), the identity management system may consult its databases to determine a list of the web-based services (e.g., GMAIL™, SALESFORCE™, SLACK™, etc.) to which the user has access (e.g., as granted by the user's organization), as well as the credentials that the user uses on those services, and automatically sign the user in to those services.

Figure 3:
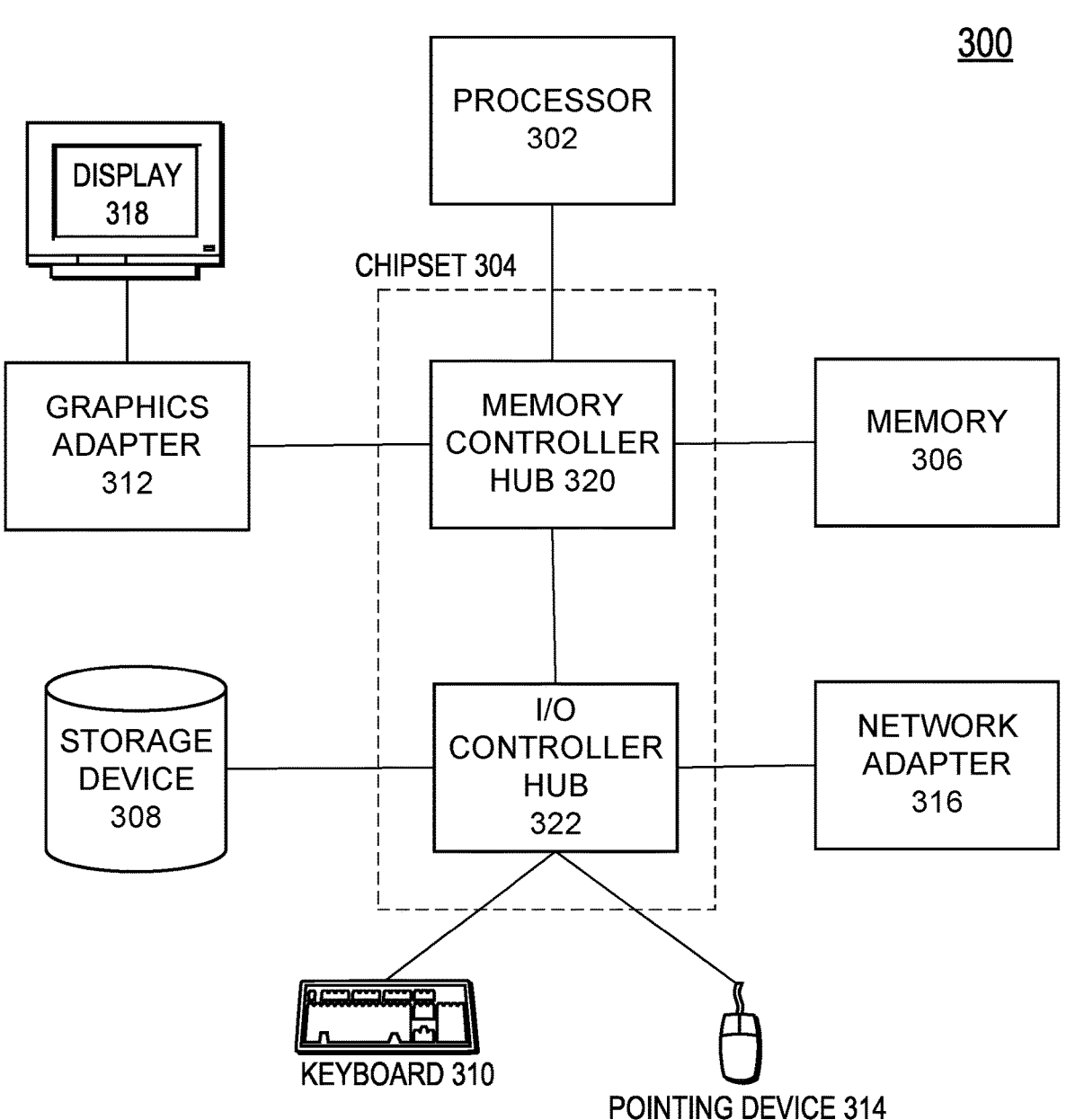
FIG. 3 is a high-level block diagram illustrating physical components of a computer used as part or all of the identity provider, client device of a user, or system providing third-party factors, according to one embodiment.

FIG. 3 is a high-level block diagram illustrating physical components of a computer 300 used as part or all of the IdP system 100, client device 122, or third-party factor provider 130, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard or pointing device. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method performed by a computing device associated with an identity provider system, the computer-implemented method comprising:
   receiving a request to authenticate an identity of a first user;
   identifying, from a plurality of authentication factors associated with the first user, a first authentication factor as a default authentication factor for the first user;
   selecting, based at least in part on a health of the first authentication factor being below a threshold degree of health and a health of a second authentication factor of the plurality of authentication factors being above the threshold degree of health, the second authentication factor as an updated default authentication factor for the first user, wherein the health of the first authentication factor is based at least in part on a quantity of successful identity verifications using the first authentication factor relative to a quantity of unsuccessful identity verifications using the first authentication factor;
   generating, based at least in part on a health of each authentication factor of the plurality of authentication factors, a ranked listing of the plurality of authentication factors, wherein the updated default authentication factor is indicated as a highest ranking authentication factor in the ranked listing of the plurality of authentication factors; and
   transmitting, to a second computing device, the ranked listing of the plurality of authentication factors.

2. The computer-implemented method of claim 1, wherein the ranked listing of the plurality of authentication factors is based at least in part on a history of usage by the first user of one or more authentication factors of the plurality of authentication factors, a user preference of the first user, an organizational preference of an organization associated with the first user, one or more rules, or a combination thereof.

3. The computer-implemented method of claim 1, further comprising:
   calculating, based at least in part on the health of each authentication factor of the plurality of authentication factors, a factor health score for each authentication factor of the plurality of authentication factors, wherein the ranked listing of the plurality of authentication factors is further based at least in part on the factor health score for each authentication factor of the plurality of authentication factors.

4. The computer-implemented method of claim 1, wherein the health of the first authentication factor is based at least in part on a quantity of errors encountered when using the first authentication factor to authenticate identities of one or more users.

5. The computer-implemented method of claim 1, wherein the health of the first authentication factor is based at least in part on metadata associated with at least one of the first user or the identity provider system.

6. The computer-implemented method of claim 5, wherein the metadata comprises at least one of:
   a version of an application of the identity provider system that is installed on a client device of the first user, a version of an operating system of the client device of the first user, an internet protocol (IP) address of the client device of the first user, or a geographical location of the client device of the first user.

7. The computer-implemented method of claim 1, wherein the plurality of authentication factors comprise one or more of:
   a biometric reading, a push notification, an email, a voice message, or a one-time password provided over short message service (SMS).

8. The computer-implemented method of claim 1, further comprising:
   identifying electronic services to which the first user has been granted access;
   identifying credentials of the first user for the identified electronic services; and
   signing the first user in to the identified electronic services using the credentials.

9. The computer-implemented method of claim 1, further comprising:
   omitting, based at least in part on the first authentication factor being below the threshold degree of health, the first authentication factor from inclusion in the ranked listing of the plurality of authentication factors.

10. The computer-implemented method of claim 1, wherein selecting the second authentication factor as the updated default authentication factor comprises replacing the default authentication factor with the updated default authentication factor.

11. A computing device associated with an identity provider system, the computing device comprising:

a processor; and memory storing instructions that, when executed by the processor, cause the computing device to:

receive a request to authenticate an identity of a first user;

identify, from a plurality of authentication factors associated with the first user, a first authentication factor as a default authentication factor for the first user;

select, based at least in part on a health of the first authentication factor being below a threshold degree of health and a health of a second authentication factor of the plurality of authentication factors being above the threshold degree of health, the second authentication factor as an updated default authentication factor for the first user, wherein the health of the first authentication factor is based at least in part on a quantity of successful identity verifications using the first authentication factor relative to a quantity of unsuccessful identity verifications using the first authentication factor;

generate, based at least in part on a health of each authentication factor of the plurality of authentication factors, a ranked listing of the plurality of authentication factors, wherein the updated default authentication factor is indicated as a highest ranking authentication factor in the ranked listing of the plurality of authentication factors; and transmit, to a second computing device, the ranked listing of the plurality of authentication factors.

12. The computing device of claim 11, wherein the ranked listing of the plurality of authentication factors is based at least in part on a history of usage by the first user of one or more authentication factors of the plurality of authentication factors, a user preference of the first user, an organizational preference of an organization associated with the first user, one or more rules, or a combination thereof.

13. The computing device of claim 11, wherein the instructions, when executed by the processor, further cause the computing device to:

calculate, based at least in part on the health of each authentication factor of the plurality of authentication factors, a factor health score for each authentication factor of the plurality of authentication factors, wherein the ranked listing of the plurality of authentication factors is further based at least in part on the factor health score for each authentication factor of the plurality of authentication factors.

14. The computing device of claim 11, wherein the health of the first authentication factor is based at least in part on a quantity of errors encountered when using the first authentication factor to authenticate identities of one or more users.

15. The computing device of claim 11, wherein the health of the first authentication factor is based at least in part on metadata associated with at least one of the first user or the identity provider system, and wherein the metadata comprises at least one of:

a version of an application of the identity provider system that is installed on a client device of the first user, a version of an operating system of the client device of the first user, an internet protocol (IP) address of the client device of the first user, or a geographical location of the client device of the first user.

16. The computing device of claim 11, wherein the instructions, when executed by the processor, further cause the computing device to:

omit, based at least in part on the first authentication factor being below the threshold degree of health, the first authentication factor from inclusion in the ranked listing of the plurality of authentication factors.

17. The computing device of claim 11, wherein, to select the second authentication factor as the updated default authentication factor, the instructions, when executed by the processor, cause the computing device to:

replace the default authentication factor with the updated default authentication factor.

18. A non-transitory, computer-readable medium storing instructions that, when executed by a processor of a computing device associated with an identity provider system, perform actions comprising:

receiving a request to authenticate an identity of a first user;

identifying, from a plurality of authentication factors associated with the first user, a first authentication factor as a default authentication factor for the first user;

selecting, based at least in part on a health of the first authentication factor being below a threshold degree of health and a health of a second authentication factor of the plurality of authentication factors being above the threshold degree of health, the second authentication factor as an updated default authentication factor for the first user, wherein the health of the first authentication factor is based at least in part on a quantity of successful identity verifications using the first authentication factor relative to a quantity of unsuccessful identity verifications using the first authentication factor;

generating, based at least in part on a health of each authentication factor of the plurality of authentication factors, a ranked listing of the plurality of authentication factors, wherein the updated default authentication factor is indicated as a highest ranking authentication factor in the ranked listing of the plurality of authentication factors; and transmitting, to a second computing device, the ranked listing of the plurality of authentication factors.

19. The non-transitory, computer-readable medium of claim 18, wherein the ranked listing of the plurality of authentication factors is based at least in part on a history of usage by the first user of one or more authentication factors of the plurality of authentication factors, a user preference of the first user, an organizational preference of an organization associated with the first user, one or more rules, or a combination thereof.

20. The non-transitory, computer-readable medium of claim 18, wherein the instructions, when executed by the processor, further perform actions comprising:

calculating, based at least in part on the health of each authentication factor of the plurality of authentication factors, a factor health score for each authentication factor of the plurality of authentication factors, wherein the ranked listing of the plurality of authentication factors is further based at least in part on the factor health score for each authentication factor of the plurality of authentication factors.

* * * * *